(No Model.)
F. W. DIEHL.
SIGNALING DEVICE FOR RAILWAY CARS.
No. 602,434. Patented Apr. 19, 1898.
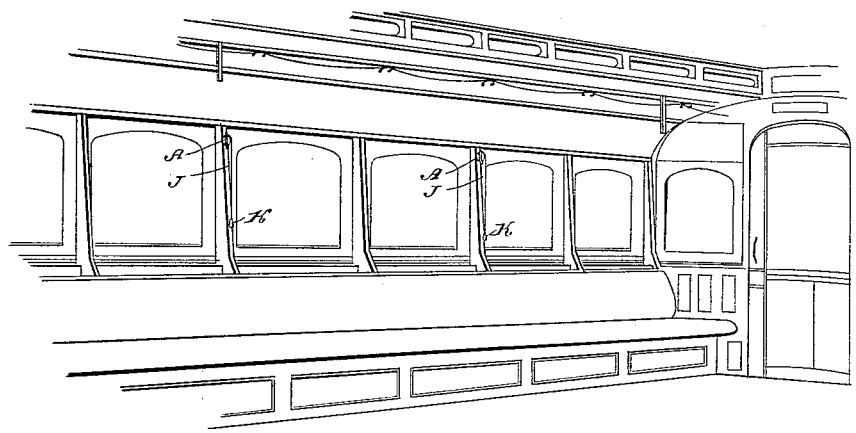
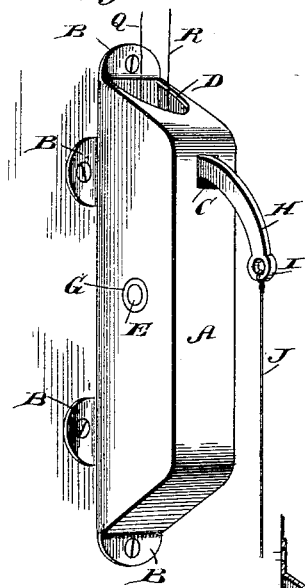 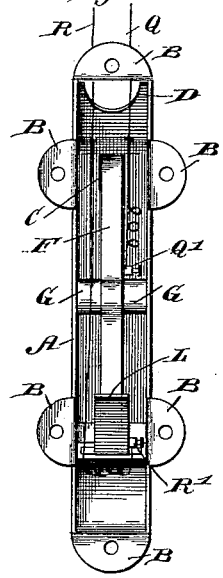 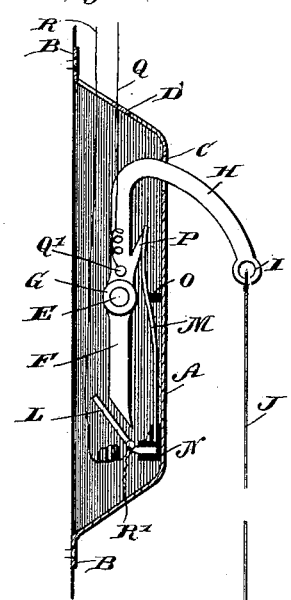
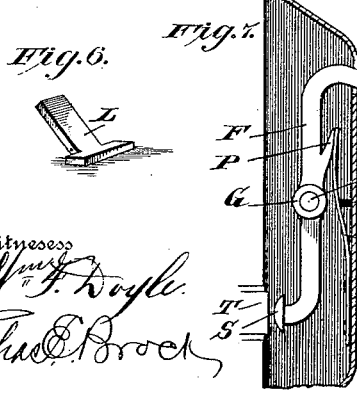 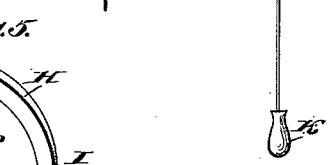
Witnesses
Wm F. Doyle
Chas E. Brock
Inventor
Frank W. Diehl,
by Munn & Co.
Attorneys

UNITED STATES PATENT OFFICE.

FRANK W. DIEHL, OF DETROIT, MICHIGAN.

SIGNALING DEVICE FOR RAILWAY-CARS.

SPECIFICATION forming part of Letters Patent No. 602,434, dated April 19, 1898.

Application filed September 28, 1897. Serial No. 653,310. (No model.)

*To all whom it may concern:*

Be it known that I, FRANK W. DIEHL, residing at Detroit, in the county of Wayne and State of Michigan, have invented a new and useful Signaling Device for Railway-Cars, of which the following is a specification.

My invention relates to electric signaling devices designed especially for use in street-cars, but capable of application in any position where push-buttons are now in use, my device being intended to take the place of push-buttons and like circuit-closers.

The object of my invention is to furnish means for closing electric circuits, especially bell-circuits, which shall remove many of the objectionable features of push-buttons and like circuit-closers.

With this object in view my invention consists in the improved construction, arrangement, and combination of parts hereinafter fully described, and afterward specifically pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a perspective view of the interior of a car equipped with signaling devices constructed in accordance with my invention. Fig. 2 is a detail perspective view of my invention. Fig. 3 is an interior or rear elevation thereof. Fig. 4 is a central vertical section through the same. Fig. 5 is a detail perspective view of the contact-levers. Fig. 6 is a detail perspective view of the contact-plate. Fig. 7 is a detail view, in vertical section, illustrating a slightly-modified form of the invention.

Like letters of reference mark the same parts wherever they occur in the various figures of the drawings.

Referring to the drawings by letters, A is a casing, which may be made of any suitable material, sheet metal being preferable, said casing being either cast or stamped up from sheet metal. The casing is provided with lugs B, through which are to be passed screws for securing it to the interior of a car above the passengers' heads or in any other position or place in which it is desired to apply the invention. In the front of the casing is an opening C and in the top thereof an opening D, while the sides are provided with circular openings to act as bearings for the trunnions E of a lever F. These trunnions E are encircled by sleeves G of insulating material to prevent the electric contact between the trunnions and the metal of which the casing is made. The lever F is provided with an outwardly and downwardly bent end H, which projects through the opening C in the front of the casing and is provided at its lower end with an eye I, in which is secured the upper end of a cord J, provided at its lower end with a handle K. The lower end of the lever F is arranged to contact with a contact-plate L, secured to the front of the casing and extending backwardly and rearwardly in the path of movement of the lower end of the lever when operated by pulling on the cord J. A spring M, mounted in the block N, of insulating material, secured to the inside of the front of the casing, has a bearing against a stop O, of insulating material, and an arm P of the lever F, the normal tendency of this spring being to hold the lower end of the lever out of contact with the contact-plate L.

Q is one wire of the circuit and is attached at Q' to the lever F. R is the other wire, which is attached at R' to the contact-plate L. These wires pass out through the opening D in the top of the casing.

The devices being constructed as hereinbefore described and placed in position in a car, for instance, where it will be secured to the side above the heads of the passengers, it will be operated by the passenger by grasping the handle K and drawing downward on the cord J. This act will oscillate the lever on its trunnions E against the action of the spring M and cause the lower end of the lever to come into contact with the contact-plate L, which will close the circuit and sound the alarm.

In Fig. 7 I have illustrated a slightly-modified form, the only change being in the shape of the lower end of the contact-lever F, which in this instance is provided with a button-shaped head S, which is intended when the cord is pulled to come in contact with a push-button T and thus close the circuit and sound the alarm. Otherwise the construction is the same as that shown in the other figures.

It will be understood that any number of my circuit-closers may be used in a car and that the device can readily be converted into a circuit-breaker for use with a closed circuit.

The advantages attending the use of my invention are numerous and will be obvious from the foregoing description. The use of push-buttons is done away with and the wear on the fingers due to the continued use of push-buttons is obviated. The device being located high up in the car, it can be introduced therein without the necessity of embedding wires in the wood, the cord extending down along the pilasters within the reach of the passengers. It will be extremely durable, there being nothing in its construction liable to give out or wear, except, possibly, the cords, which can be easily and cheaply renewed. Where it is desired to substitute these devices for push-buttons already in use, the push-button may be removed or not, as may be desired. When the button is removed, the contact will be made with the inner contact-plate, which will be left in place.

While I have illustrated and described the best means now known to me for carrying out my invention, I wish it to be understood that I do not restrict myself to the exact forms and constructions shown, but hold that any such slight changes or variations as might suggest themselves to the ordinary mechanic will properly fall within the limit and scope of my invention.

Having thus fully described my invention, what I claim as new, and desire to secure by Letters Patent of the United States, is—

1. The herein-described circuit-closing device, comprising a casing adapted to be secured to the car above the heads of the passengers and provided with openings in the top and front, the insulated pivoted contact-lever having one end projected through the front opening, the insulated contact-plate secured inside the casing in the path of the movement of the lever, the insulated spring for normally holding the lever and plate apart, the circuit-wires entering the casing through the top opening and connected respectively to the lever and contact-plate, and a cord attached to the projecting end of the lever and depending in reach of the passengers, substantially as described.

2. The herein-described circuit-closing device comprising a hollow metal casing provided with lugs or ears to receive screws to secure it to the wall of the car above the heads of the passengers, said casing being open in the rear and provided with an opening, C, in the front, an opening, D, in the top and openings in the sides, the lever, F, provided with insulated trunnions journaled in the openings in the sides of the casing and having a bent forward end projecting through the opening, C, in the front of the casing, a spring, M, secured in the block of insulating material in the interior of the casing, a stop-block, O, of insulating material engaging said spring, the contact-plate, L, secured in a block of insulating material in the interior of the casing in the path of movement of the lever, and the line-wires, Q and R, passing through the opening, D, in the top of the casing, the former connecting to the lever, F, and the latter to the contact-plate, L, substantially as described.

FRANK W. DIEHL.

Witnesses:
LOUIS P. HIRTZEL,
CLIFTON H. TILDEN.